US005971624A

United States Patent [19]

Giebel et al.

[11] Patent Number: 5,971,624

[45] Date of Patent: Oct. 26, 1999

[54] MULTI-FIBER SPLICE MECHANISM AND ASSOCIATED SPLICING CONNECTOR

[75] Inventors: Markus A. Giebel; Dennis M. Knecht; James P. Luther; Thomas Theuerkorn, all of Hickory, N.C.

[73] Assignee: Siecor Corporation, Hickory, N.C.

[21] Appl. No.: 09/000,806

[22] Filed: Dec. 30, 1997

[51] Int. Cl.[6] ........ G02B 6/38

[52] U.S. Cl. ........ 385/59; 385/95

[58] Field of Search ........ 385/80–84, 59, 385/95–99, 147

[56] References Cited

U.S. PATENT DOCUMENTS

| | | | |
|---|---|---|---|
| 3,559,698 | 2/1971 | Smith | 29/751 |
| 4,135,783 | 1/1979 | Kunze | 350/96.21 |
| 4,513,171 | 4/1985 | Suffi et al. | 174/41 |
| 4,900,124 | 2/1990 | Lampert et al. | 385/73 |
| 4,964,689 | 10/1990 | Wichansky | 385/96 |
| 5,381,498 | 1/1995 | Bylander | 385/83 |

*Primary Examiner*—Akm E. Ullah

[57] ABSTRACT

A splicing connector and an associated splice mechanism are provided to splice first and second pluralities of optical fibers without buckling the optical fibers. The connector includes a housing and a retainer disposed of at least partially within the housing which defines a channel through which a plurality of optical fibers extend. The connector also includes a clip for securing the optical fibers within the retainer such that the end portions of the optical fibers are exposed through the forward end of the housing in preparation for splicing the optical fibers. Further, the connector includes a spring for urging the retainer and the optical fibers secured within the retainer toward the forward end of the housing, thereby permitting the optical fibers to be spliced without buckling the optical fibers.

18 Claims, 5 Drawing Sheets

FIG. 10.
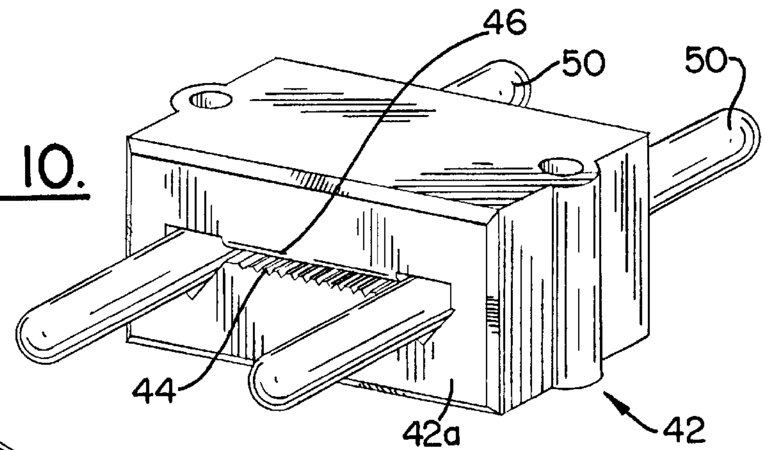
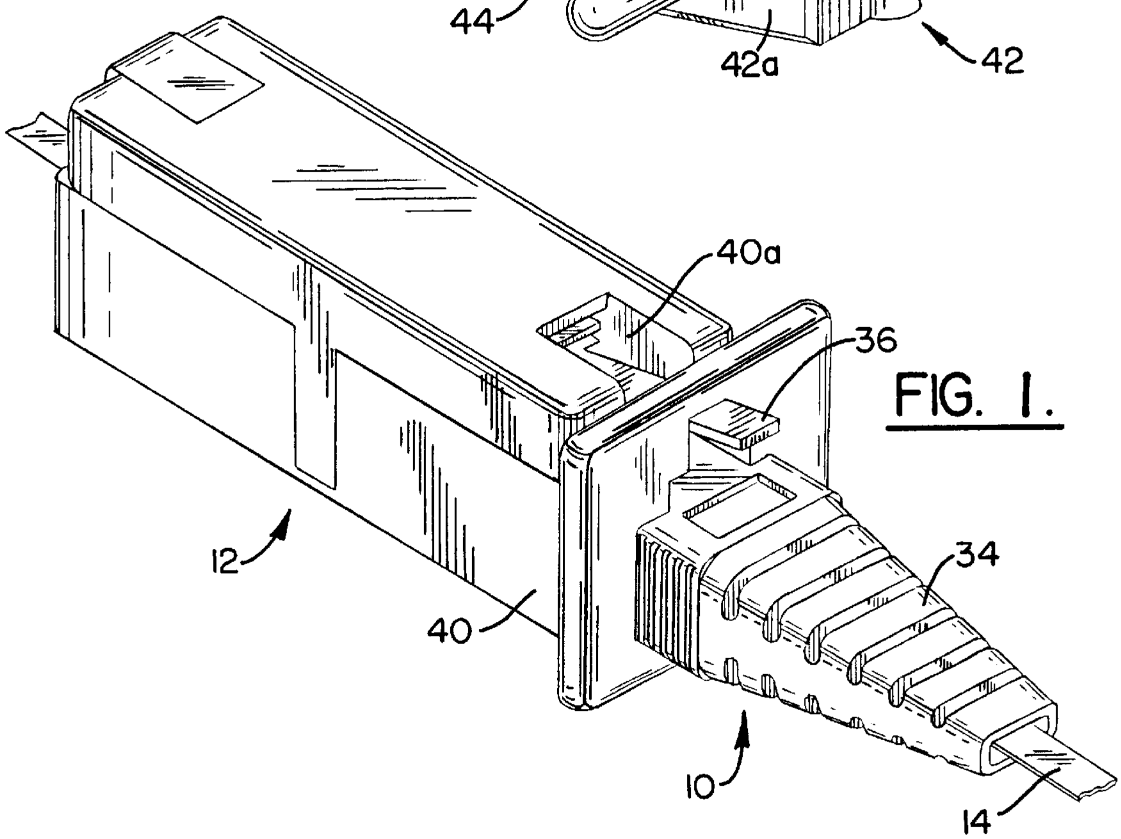
FIG. 1.

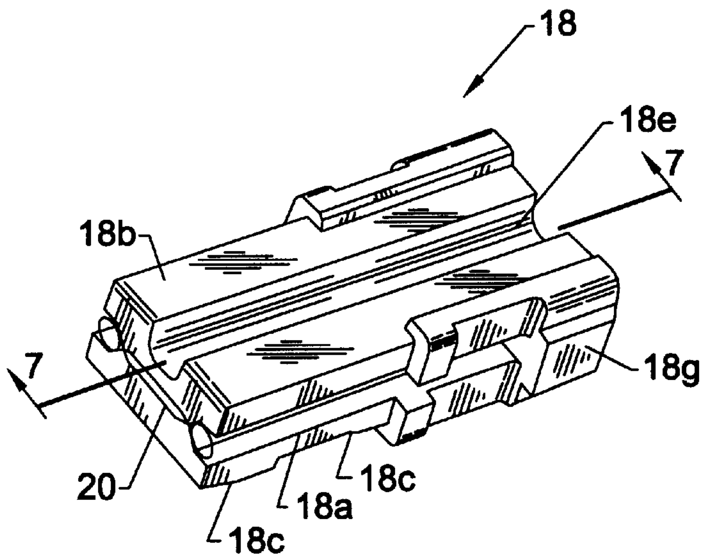
FIG. 6.
FIG. 7.
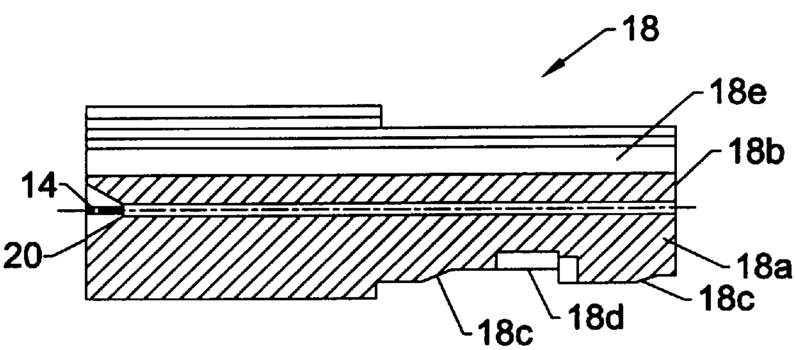
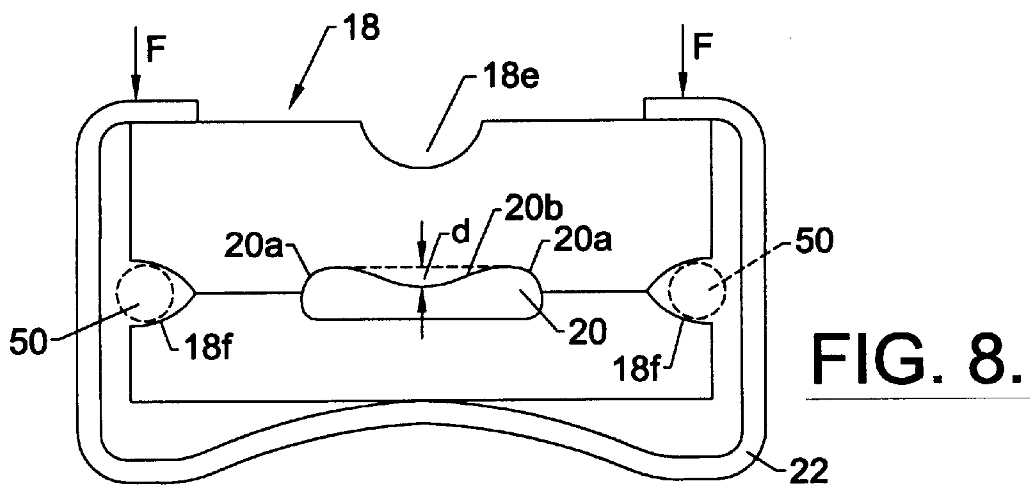
FIG. 8.

MULTI-FIBER SPLICE MECHANISM AND ASSOCIATED SPLICING CONNECTOR

FIELD OF THE INVENTION

The present invention relates generally to splice mechanisms and associated splicing connectors that permit multiple optical fibers to be spliced and, more particularly, to splice mechanisms and associated splicing connectors that permit multiple optical fibers to be spliced without buckling the optical fibers.

BACKGROUND OF THE INVENTION

A number of multi-fiber connectors, such as MTP connectors, are available to mate with other multi-fiber connectors in order to optically interconnect a plurality of optical fibers. Conventional multi-fiber connectors require a ferrule that is mounted upon the end portions of the optical fibers in order to secure the optical fibers in a fixed position relative to the connector. For example, an MTP connector includes an MT ferrule. Since ferrules require relatively high precision, conventional multi-fiber connectors that include ferrules are generally relatively expensive.

Multiple optical fibers can also be optically interconnected by means of a splice, such as a mechanical splice. As described below, several mechanical splices are currently available to splice multiple optical fibers. While these conventional multi-fiber mechanical splices are much less expensive than the conventional multi-fiber connectors, conventional multi-fiber mechanical splices suffer from several deficiencies which can impair the quality of the spliced connections, both immediately and over time.

One of the multi-fiber mechanical splices that is currently available is the VOLITION™ splice provided by 3M. The VOLITION™ splice includes an angled sleeve for aligning two pairs of optical fibers that are inserted through the opposed ends of the sleeve. In this regard, a pair of grooves are defined within the sleeve to receive and align respective end portions of the optical fibers. Due to the angled configuration of the VOLITION™ splice, at least one pair of the optical fibers is buckled or bent in order to make the necessary optical interconnection. By buckling the optical fibers, the optical fibers themselves provide the spring force which urges the end portions of the respective pairs of optical fibers together in order to make the desired optical interconnection.

It has been found, however, that optical fibers that remain buckled for a long time, such as for more than a year, are more prone to degradation and increased loss as a result of flaws induced in the optical fibers, typically during the process of stripping the buffer jacket from the optical fibers. In addition, the end faces of the optical fibers must generally be beveled such that the end facets are not scratched during insertion of the fibers into the respective grooves defined within the angled sleeve. Moreover, the VOLITION™ splice spaces the optical fibers apart by 750 microns. While a 750 micron spacing is acceptable for splicing a pair of optical fibers, a splice incorporating the splicing and spacing techniques of the VOLITION™ splice would quickly become unacceptably large if the splice was designed to interconnect more than two optical fibers, such as twelve or more optical fibers.

While there are currently several multi-fiber mechanical splices available, conventional multi-fiber mechanical splices suffer from a variety of deficiencies. As such, it is therefore desirable to provide a mechanical splice that provides for the in-line splicing of a plurality of optical fibers in a relatively compact housing without requiring or permitting the optical fibers to buckle. It is also desirable to provide a mechanical splice that permits the optical fibers to be readily spliced and separated, much in the same fashion that connectors can be mated and demated.

SUMMARY OF THE INVENTION

A splicing connector and an associated splice mechanism are provided according to the present invention to splice first and second pluralities of optical fibers without buckling the optical fibers. While the connector of the present invention is independent of a ferrule, the connector includes a housing extending between opposed forward and rear ends and a retainer disposed of at least partially within the housing which defines a channel through which a plurality of optical fibers extend. The connector also includes means, such as a clip, for securing the optical fibers within the retainer such that the end portions of the optical fibers are exposed through the forward end of the housing in preparation for splicing the optical fibers. Further, the connector includes bias means, such as a spring, for urging the retainer and the optical fibers secured within the retainer toward the forward end of the housing, thereby permitting the optical fibers to be spliced without buckling the optical fibers.

According to one advantageous embodiment, the retainer includes first and second portions having respective inner surfaces that are disposed in a facing relationship. According to this embodiment, at least one of the first and second portions defines a channel opening through the respective inner surface for receiving a plurality of optical fibers, typically provided in the form of a fiber optic ribbon. As such, the fiber optic ribbon will be securely held within the channel as external forces are applied to force the first and second portions together. The channel defined by at least one of the first and second portions is further defined by a pair of opposed side walls and a contact surface that extends between the pair of opposed side walls. In order to apply a relatively uniform force across the width of the fiber optic ribbon in instances in which the first and second portions are forced together by nonuniform external forces, a medial section of the contact surface is preferably bowed or arched. For example, the medial section of the contact surface may extend into the channel to compensate for external forces applied primarily along opposed edges of the retainer.

A splice mechanism is also provided according to the present invention. The splice mechanism includes a coupling sleeve extending between opposed first and second ends through which the first and second pluralities of optical fibers extend, respectively. Typically, splicing connectors as described above are mounted upon the end portions of the first and second pluralities of optical fibers and are inserted into the opposed ends of the coupling sleeve. The splice mechanism of this embodiment also includes a splice body disposed within the coupling sleeve for receiving and aligning end portions of the first and second optical fibers such that respective ones in the first and second optical fibers are optically interconnected. The splice body includes a first portion defining a plurality of grooves for receiving end portions of the first and second optical fibers. The splice body also includes a second portion overlying the first portion to hold the end portions of the first and second optical fibers within their respective grooves. According to the present invention, at least one edge of the second portion that is adjacent to one end of the grooves is beveled and, more preferably, rounded to facilitate insertion of the optical fibers into the respective grooves.

Therefore, the splicing connector and associated splice mechanism of the present invention permits first and second pluralities of optical fibers to be readily spliced without buckling or otherwise bending the optical fibers. In addition, the design of the splicing connector and the associated splice mechanism permits the optical fibers to be closely spaced, such as with a 250 micron center-to-center spacing, such that a relatively large number of optical fibers, such as twelve or more optical fibers, can be spliced without requiring the splicing connector and the associated splice mechanism to be unacceptably large. Furthermore, the retainer of the present invention is advantageously designed to securely engage a fiber optic ribbon by applying a relatively constant force across the width of the fiber optic ribbon, even in instances in which the force that clamps the retainer about the fiber optic ribbon is applied along the edge portions of the retainer. Thus, the splicing connector and associated splice mechanism of the present invention provides a high-quality splice which will not degrade over time.

BRIEF DESCRIPTION OF THE DRAWINGS

FIG. 1 is a perspective view of a splice mechanism and a splicing connector according to one embodiment of the present invention.

FIG. 6 is a perspective view of a retainer according to one embodiment of the present invention.

FIG. 7 is a cross-sectional view of the retainer of FIG. 6 taken along line 7—7.

FIG. 8 is a cross-sectional view of a retainer and an associated clip according to one embodiment of the present invention which illustrates a channel having a contact surface that extends into the channel.

FIG. 10 is a perspective view of a splice body of the splice mechanism of one embodiment of the present invention.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Referring now to FIG. 1, a splicing connector 10 and an associated splice mechanism 12 according to the present invention are illustrated. As shown in more detail in FIGS. 4 and 5, the splicing connector is independent of a ferrule, that is, the splicing connector does not include a ferrule. Thus, the splicing connector of the present invention is generally significantly less expensive than conventional multi-fiber connectors that include a multi-fiber ferrule.

Figure 2:
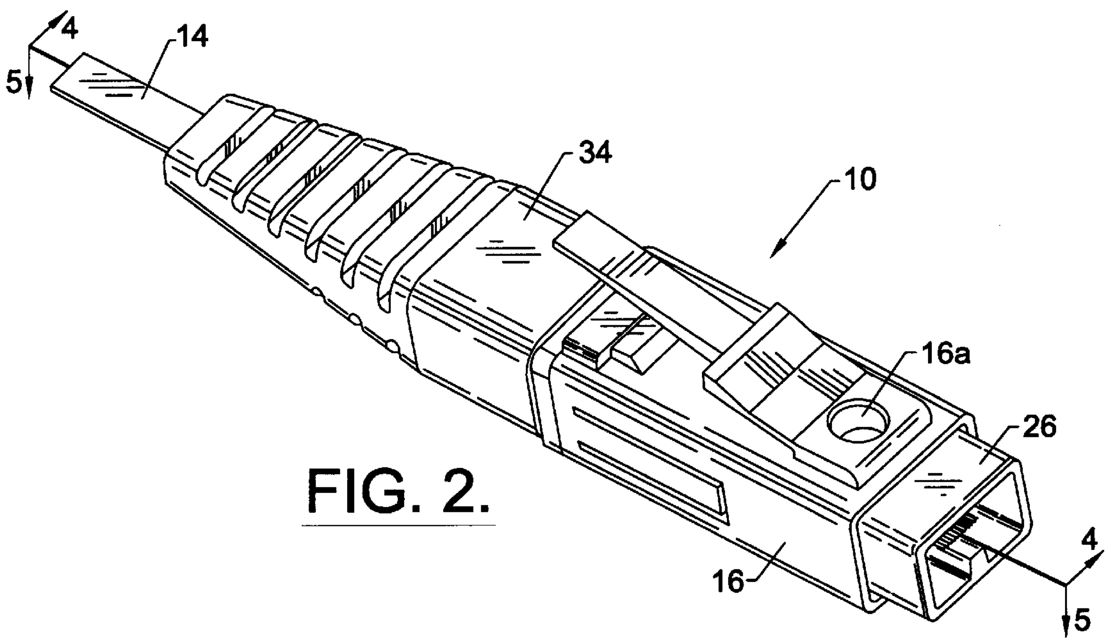
FIG. 2 is a perspective embodiment of a splicing connector according to one embodiment of the present invention.
Figure 3:
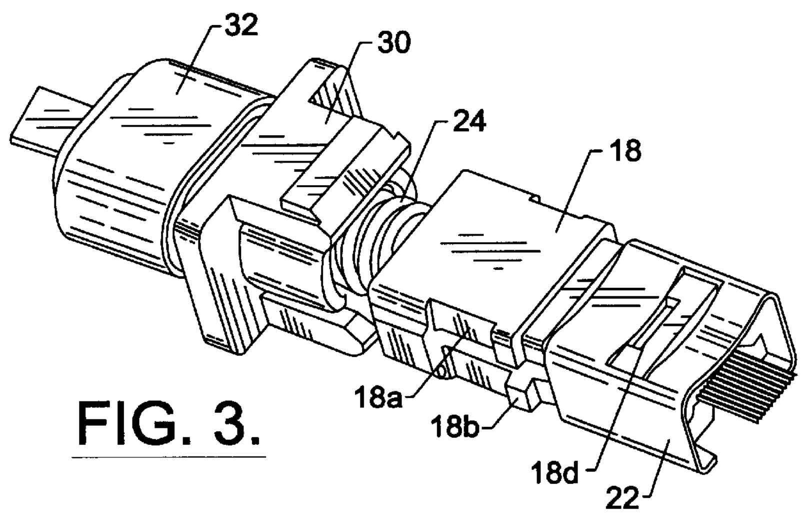
FIG. 3 is a perspective view of the internal components of one embodiment of the splicing connector of the present invention, including the retainer, the clip, the crimp body and the crimp band.
Figure 4:
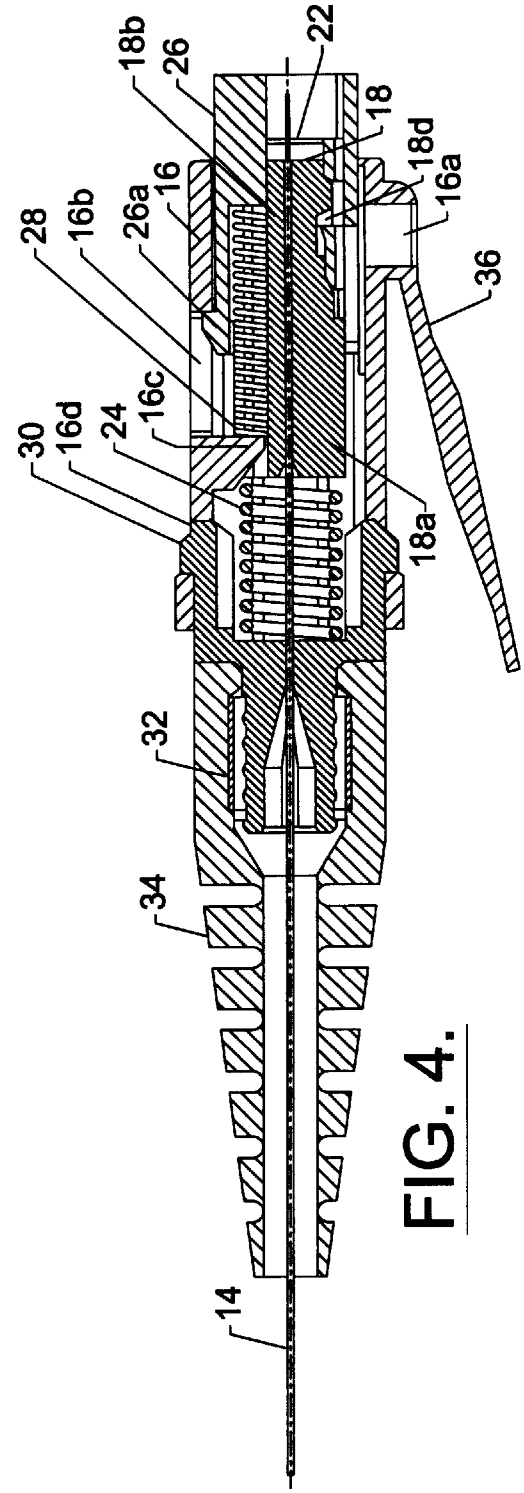
FIG. 4 is a cross-sectional view of the splicing connector of FIG. 2 taken along line 4—4.
Figure 5:
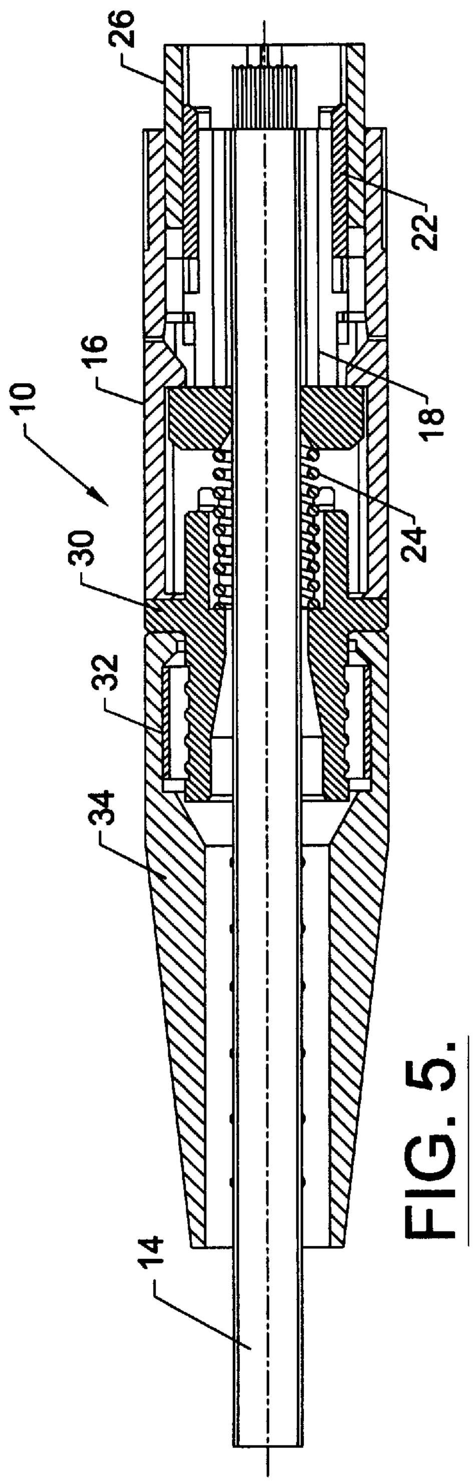
FIG. 5 is a cross-sectional view of the splicing connector of FIG. 2 taken along line 5—5.

The splicing connector 10 is mounted upon the end portion of a plurality of optical fibers 14 to facilitate splicing of the optical fibers, as described below. Typically, the plurality of optical fibers are provided in the form of a fiber optic ribbon, such as a twelve fiber ribbon. As shown in FIGS. 2, 4 and 5, the connector includes a housing 16 that is typically formed of plastic. The housing extends between opposed forward and rear ends and defines a passageway extending lengthwise therebetween. The splicing connector also includes a retainer 18, typically formed of an elastomeric material such as MORTHANE™ thermoplastic polyurethane that is provided by Morton Company, that is disposed within the passageway defined by the housing. In turn, the retainer defines a channel 20 as described hereinbelow through which the plurality of optical fibers extend. Thus, as shown in FIGS. 2–5, the optical fibers extend through the rear end of the housing and through the channel defined by the retainer so as to be exposed through the forward end of the housing, such as for splicing with the respective end portions of other optical fibers.

The splicing connector 10 also includes means for securing the plurality of optical fibers within the retainer 18. Although a variety of means can be utilized to secure the optical fibers within the retainer, the securing means of one particularly advantageous embodiment in which the retainer is formed of first and second portions 18*a*, 18*b* includes a clip 22 that at least partially surrounds the retainer for forcing the first and second portions together in order to secure the optical fibers therebetween. Preferably, the clip is formed of a metal, such as stainless steel or beryllium copper, in order to provide sufficient clamping force to urge the first and second portions of the retainer together without creating a high enough level of stress to induce creep within the retainer. Although the clip could fully encircle the retainer, the clip of one embodiment is C-shaped as shown in cross-section in FIGS. 3 and 8. According to this embodiment, the clip is generally adapted to be moved between an open position in which the optical fibers are free to move within the channel defined by the retainer and a clamped position in which the optical fibers are securely held within the channel defined by the retainer.

As shown in FIGS. 4, 6 and 7, the exterior surface of the first portion 18*a* of the retainer 18 of one advantageous embodiment includes an incline 18*c* such that a rear section of the first portion of the retainer is thicker than the forward section of the first portion of the retainer. As shown in FIG. 3, the clip 22 is therefore in the open position in instances in which the clip encircles the smaller forward portion of the retainer. As the clip is moved rearward relative to the retainer so as to advance up the incline, the clip forces the first and second portions of the retainer together, thereby securing the optical fibers within the channel 20 defined by the retainer. Thus, the clip is in the clamped position once the clip has been advanced up the incline defined by the exterior surface of the first portion of the retainer and encircles the larger rear portion of the retainer.

While the clip 22 can be moved relative to the retainer 18 in a number of fashions, the housing 16 of one advantageous embodiment defines an opening 16*a* to permit access to the clip. As such, a tool such as a screwdriver, can be inserted through the opening in order to move the clip rearward relative to the housing and, in turn, relative to the retainer. In order to further facilitate the movement of the clip relative to the retainer, the exterior surface of the first portion 18*a* of the retainer can also define a recess 18*d*, such as a circular recess, that is generally aligned with the opening defined by the housing. By inserting a tool, such as a screwdriver, into the recess and by thereafter rotating the screwdriver such that the blade of the screwdriver pushes against the clip, the clip can be moved rearward relative to the retainer so as to advance up the incline 18*c*. As shown in FIG. 3, the clip can therefore define a relatively large window aligned with the opening defined by the housing and the recess defined by the exterior surface of the first portion of the retainer to permit the tool inserted through the opening to engage the recess defined by the exterior surface of the first portion of the retainer.

The splicing connector 10 of the present invention also preferably includes bias means for urging the retainer 18 and the optical fibers 14 secured within the retainer toward the forward end of the housing 16. Although the bias means can be embodied in many different fashions, the bias means of one advantageous embodiment is a spring 24 that operably contacts a rear end of the retainer so as to urge the retainer toward the forward end of the housing. By urging the retainer and, in turn, the optical fibers secured within the retainer toward the forward end of the housing, the optical fibers can be spliced to other optical fibers as described hereinbelow without buckling or otherwise bending the optical fibers. In addition, the bias means serves to decouple the optical fibers from forces applied to the housing, thereby further improving the quality and durability of the resulting splice.

The splicing connector 10 of one advantageous embodiment also includes a shroud 26, typically formed of a plastic, that is slidably attached to the housing such that the shroud extends beyond the forward end of the housing to further protect the end portions of the optical fibers 14. While the shroud can be slidably attached to the housing in a number of different manners, the shroud of one embodiment is inserted through the forward end of the housing such that a latch member 26*a* adjacent the rear end of the shroud engages a corresponding opening 16*b* defined by the housing. Since the opening defined by the housing is larger than the corresponding latch member of the shroud, the shroud is adapted to move lengthwise relative to the housing.

As shown in FIG. 4, the splicing connector 10 can also include shroud bias means for urging the shroud 26 further through the forward end of the housing 16. For example, the shroud bias means can include a shroud spring 28 extending between an upwardly extending shoulder 16*c* defined by the housing and a rear portion of the shroud for urging the shroud further through the forward end of the housing. In order to further reduce the overall size of the splicing connector, the exterior surface of the second portion 18*b* of the retainer 18 of this embodiment can define a lengthwise extending groove 18*e* for receiving the shroud spring.

In order to provide strain relief for the optical fibers 14, the splicing connector 10 generally includes a crimp body 30 and a crimp band 32 that encircles a rear portion of the crimp body. As shown in FIGS. 3 and 4, the crimp body of one advantageous embodiment includes latch arms that extend into the rear end of the housing 16 and which engage corresponding windows 16*d* defined by the rear end of the housing. As such, the strength members of the fiber optic cable, such as the KEVLAR™ yarn that surrounds the optical fibers, can be crimped between the crimp band and the crimp body. As such, the crimp body and the crimp band are typically formed of metal with the crimp band typically formed of brass as known to those skilled in the art. In order to provide bend relief for the optical fiber, the connector can also include a boot 34 that is operably attached to the rear end of the housing, such as by frictional engagement with the crimp band and crimp body as shown in FIG. 4. In order to be sufficiently compliant, the boot is generally formed of plastic.

Although the splicing connector 10 can be coupled to the associated splice mechanism 12 in a variety of manners, the housing of one advantageous embodiment includes a latch 36, such as an RJ-type latch, for engaging a corresponding window defined by the splice mechanism. However, the housing can include many other types of latches or no latch at all without departing from the spirit and scope of the present invention.

As described above, the retainer 18 preferably includes first and second portions, 18*a*, 18*b* having respective inner surfaces that are disposed in a facing relationship. While the first and second portions can be separate, discrete parts, the retainer of one embodiment is generally U-shaped with the first and second portions being formed by the opposed sides of the U-shaped retainer. See, for example, FIG. 6 in which the U-shaped retainer includes a first (lower) portion that is joined to a second (upper) portion by the rightmost portion of the retainer, designated 18*g*.

As shown in FIGS. 6–8, at least one and, more typically, both of the first and second portions 18*a*, 18*b* define a channel 20 opening through the respective inner surfaces for receiving the fiber optic ribbon 14. In addition, the embodiment of the retainer 18 that is U-shaped as shown in FIG. 6 also preferably defines a channel through the portion 18*g* of the retainer that joins the first and second portions and aligned with the channel defined by the first and second portions such that the fiber optic ribbon can extend lengthwise through the channel defined by the retainer. As such, the fiber optic ribbon can be securely held within the channel as the first and second portions are forced together. The channel is typically defined by a pair of opposed side walls 20*a* and a contact surface 20*b* extending between the pair of an opposed side walls.

Upon application of a compressive force, the first and second portions 18*a*, 18*b* are urged together such that the contact surface 20*b* contacts the fiber optic ribbon 14 and securely holds the fiber optic ribbon within the retainer 18. Unfortunately, in instances in which the compressive force is not applied evenly across the exterior surface of each portion of the retainer, but is, instead, applied along the opposed, lengthwise extending edges of one of the retainer portions, the respective portion of the retainer tends to bow, thereby applying an undesirably large amount of force along the lateral edges of the fiber optic ribbon without applying a sufficient force to the medial portion of the fiber optic ribbon. Thus, the fiber option ribbon may not be securely held within the retainer or the fiber optic ribbon may actually be damaged by the excessive forces applied along the opposed lateral edges thereof. In addition, the application of different amounts of pressure to the various optical fibers of the fiber optic ribbon can create performance differences between the optical fibers as a result of microbending.

Accordingly, the retainer 18 of one particularly advantageous embodiment defines a channel 20 having a contact surface 20*b* that is bowed to compensate for the bowing of the retainer that occurs upon the nonuniform application of external forces across the width of the retainer. Thus, the contact surface will uniformly contact the fiber optic ribbon 14 across the width of the fiber optic ribbon as the first and second portions are forced together by the nonuniform external forces.

In one advantageous embodiment illustrated in FIG. 8, the contact surface 20*b* of one portion of the retainer 18 extends into the channel 20 to uniformly contact the fiber optic ribbon 14 as the first and second portions are forced together. As shown in FIG. 8, the medial section of the contact.

surface preferably extends into the channel. For example, the medial section of the contact surface can be arched or rounded so as to extend into the channel. In one advantageous embodiment, the entire width of the contact surface is slightly rounded or bowed into the channel. In any event, the centermost portion of the contact surface of this embodiment preferably extends further into the channel than lateral portions of the contact surface. Correspondingly, those portions of the contact surface adjacent the opposed side walls 20*a* preferably extend the least, if at all, into the channel.

As described above, external forces applied along the lateral edges of the exterior surface of the retainer 18 will still tend to bow the respective portion of the retainer. Since the medial portion of the contact surface 20*b* extends into the channel, however, the retainer of this advantageous embodiment compensates for the bowing of the respective portion of the retainer such that the entire contact surface is brought into contact with the fiber optic ribbon. Conversely, in embodiments in which the external forces will be primarily applied along the centerline of the retainer and not along the opposed lateral edges, the contact surface can be concave, i.e., bowed outwardly, to compensate for the bowing of the retainer. Regardless of the embodiment, the retainer of the present invention will therefore apply relatively equal forces across the width of the fiber optic ribbon, thereby more securely engaging the fiber optic ribbon within the retainer without damaging the fiber optic ribbon.

In the embodiment in which external forces are applied along the opposed lateral edges of the retainer 18, the medial section of the contact surface 20*b* can extend by different amounts into the channel 20 depending upon the material properties of the retainer and the magnitude of the external forces to be applied to the retainer. In one advantageous embodiment, however, the medial section of the contact surface of one portion of the retainer preferably extends into the channel such that the distance d between the portion of the contact surface that extends the furthest into the channel and the contact surface of the other portion of the retainer that is slightly greater than the thickness of the fiber optic ribbon 14. As known to those skilled in the art, conventional fiber optic ribbon currently has a thickness of 320 microns such that the distance d is generally slightly greater than 320 microns. However, retainers can be designed according to the present invention to accept and retain fiber optic ribbon having a wide range of thicknesses, if so desired.

In embodiments in which both the first and second portions 18*a*, 18*b* of the retainer 18 define a channel 20, the medial section of the contact surface 20*b* of each channel can be bowed, for example, so as to extend into the respective channel. In the embodiment illustrated in FIG. 8, however, forces are applied along the opposed lateral edges of only the second portion of the retainer due to the lengthwise extending groove 18*e* defined by the second portion of the retainer to receive the shroud spring 28. In contrast, the clip 22 contacts and applies compressive forces to the medial section of the exterior surface of the first portion of the retainer. As such, only the second portion of the retainer of the illustrated embodiment includes a contact surface having a medial section that extends into the respective channel. Depending upon the manner in which compressive forces are applied to the first and second portions of the retainer and the relative compressibility or flexibility of the first and second portions of the retainer, however, one or both of the first and second portions can include a contact surface that is bowed either inward or outward without departing from the spirit and scope of the present invention.

In order to secure the plurality of optical fibers 14, such as a fiber optic ribbon, within the splicing connector 10, the fiber optic ribbon is initially inserted through the crimp body 30 and the second end of the housing 16 so as to extend through the channel 20 defined by the retainer 18. The fiber optic ribbon is extended through the forward end of the retainer such that a length of the fiber optic ribbon that is greater than the length of the fiber optic ribbon to be stripped extends beyond the shroud 26. The fiber optic ribbon is then stripped and cleaved using standard tools. The fiber optic ribbon is thereafter pulled rearwardly until only the stripped section of the fiber optic ribbon extends beyond the forward end of the retainer. By inserting the blade of a screwdriver through the opening 16*a* defined in the housing and engaging the recess 18*d* defined in the exterior surface of the first portion 18*a* of the retainer, the clip 22 can be moved to the clamped position by rotating the blade of the screwdriver and advancing the clip over the incline 18*c*. As a result, the fiber optic ribbon is fixed in place with respect to the retainer and, in turn, with respect to the connector. Thereafter, the crimp band 32 can be compressed or crimped about the strength members, such as the KEVLAR™ yarn, of the fiber optic ribbon cable. The boot 34 can then be slid forwardly along the fiber optic ribbon cable in order to engage the connector.

Once the splicing connector 10 has been assembled, the optical fibers 14 to which the splicing connector is mounted can be spliced to a plurality of other optical fibers, such as the plurality of optical fibers upon which another splicing connector is mounted. In order to align and splice the optical fibers, a splice mechanism 12 is also provided according to the present invention. In this regard, the splice mechanism includes a coupling sleeve 40, typically formed of a plastic or metal, extending between opposed first and second ends for receiving first and second pluralities of optical fibers, respectively, as shown in FIG. 1. The coupling sleeve is preferably adapted to receive splicing connectors 10 through one or both of the first and second opposed ends. In addition, the coupling sleeve preferably includes means for securing the splicing connector (s) at least partially within the coupling sleeve. In the embodiment shown in FIGS. 1 and 9, for example, the means for securing the splicing connectors at least partially within the coupling sleeve includes a window 40*a* or other recess for receiving and engaging a latch 36 that extends outwardly from the housing 16 of the respective splicing connectors. However, other means for securing the splicing connectors to the coupling sleeve can be provided without departing from the spirit and scope of the present invention.

The splice mechanism 12 also includes a splice body 42, typically formed of an elastomeric material that is disposed within the coupling sleeve 40 and, more typically, is disposed within a medial portion of the coupling sleeve. Although the illustrated embodiment of the splice body is not actuated, the splice mechanism can include a spring, cam or the like to actuate the splice body without departing from the spirit and scope of the invention. The splice body receives and aligns end portions of the first and second optical fibers that extend through the first and second opposed ends of the coupling sleeve, a respectively. As described above, first and second splicing connectors are generally mounted upon the end portions of the first and second pluralities of optical fibers, respectively. By receiving and aligning the end portions of the first and second optical fibers, respective ones of the first and second optical fibers are optically interconnected.

Figure 9:
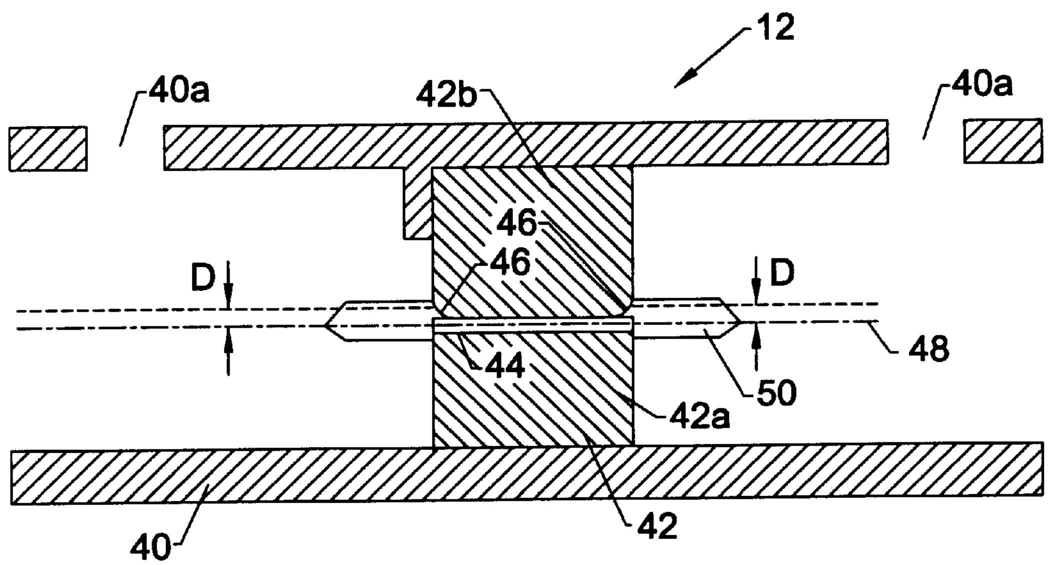
FIG. 9 is a cross-sectional view of a splice mechanism according to one embodiment of the present invention.

According to one advantageous embodiment of the present invention, the splice body 42 includes a first portion 42*a* defining a plurality of grooves for receiving end portions of the first and second optical fibers. As shown in more detail in FIG. 10, the grooves 44 are generally V-shaped and are sized such that the optical fibers fit snugly within the grooves and do not protrude beyond the grooves. As illustrated in FIG. 9, the plurality of grooves defined by the first portion of the splice body therefore define an alignment plane 48 in which the first and second optical fibers are optically interconnected. The first portion of the splice body of one advantageous embodiment defines the grooves to have a center-to-center spacing of 250 microns. Thus, the splice body of this advantageous embodiment can receive Find align a relatively large number of optical fibers, such as twelve or more optical fibers, in a relatively compact package.

The splice body 42 of this embodiment also includes a second portion 42*b* that overlies the first portion to hold the end portions of the first and second optical fibers within the respective grooves 44. In order to facilitate insertion of the optical fibers into the respective grooves, at least one edge 46 of the second portion that is adjacent one end of the grooves is beveled. Thus, the beveled edge of the second portion of the splice body serves to direct the end portions of the optical fibers into the respective grooves defined by the first portion of the splice body.

According to one advantageous embodiment, the coupling sleeve 40 is adapted to receive the first and second optical fibers at a position offset from the alignment plane 48. For example, the coupling sleeve is typically adapted to receive splicing connectors 10 which are mounted upon the end portions of the first and second optical fibers, respectively, and which hold the end portions of the first and second optical fibers at a position offset by a distance D from the alignment plane defined by the plurality of grooves 44 of the first portion 42*a* of the splice body 42. In one advantageous embodiment, the coupling sleeve and the splicing connectors combine to hold the end portions of the first and second optical fibers in a position that is offset by a distance D that is equal to approximately one-half the diameter of the optical fibers, i.e., approximately 62 microns for an optical fiber having a diameter of 125 microns. However, the coupling sleeve and the splicing connectors can combine to hold the end portions of the first and second optical fibers at other distances offset from the alignment plane without departing from the spirit and scope of the present invention. By offsetting the optical fibers from the alignment plane, the optical fibers will contact the beveled edge 46 of the second portion 42*b* of the splice body which serves to funnel the end portions of the optical fibers into the respective grooves.

Preferably, the edges 46 of the second portion 42*b* of this splice body 42 that are adjacent to both ends of the grooves 44 are beveled to facilitate insertion of the optical fibers into the respective grooves. More particularly, the beveled edge of the second portion is preferably rounded as shown in FIG. 9. As such, upon inserting the splicing connectors 10 into the opposed ends of the coupling sleeve 40, the end portions of the first and second optical fibers upon which the splicing connectors are mounted will contact the beveled edges of the second portion of the splice body which, in turn, direct the end portions of the first and second optical fibers into respective grooves which receive and align corresponding ones of the first and second optical fibers.

In order to further align the splicing connectors 10 and the splice body 42, the splice mechanism 12 of the present invention preferably includes at least one, and more typically, two alignment pins 50. The alignment pins extend through the splice body so as to engage the splicing connectors that are inserted into the coupling sleeve 40. In this regard, the retainer 18 can also define at least one and, more typically, two openings 18*f* for receiving the end portions of the alignment pins in order to facilitate alignment of the splice body with the splicing connector and, more importantly, the fiber optic ribbon 14 upon which the splicing connector is mounted.

The splice mechanism 12 of the present invention can readily interconnect first and second pluralities of optical fibers upon which a pair of splicing connectors 10 are mounted. Alternatively, the splice mechanism of FIG. 1 can include a wall plate 52 so as to be mounted in a wall such that one end of the coupling sleeve defines a wall outlet for receiving a splicing connector in order to establish optical interconnection with one or more optical fibers that have been extended through the opposed end of the coupling sleeve and are held by the splice body.

Therefore, the splicing connector 10 and associated splice mechanism 12 of the present invention permits first and second pluralities of optical fibers to be spliced without buckling the optical fibers. In addition, the design of the splicing connector and the associated splice mechanism permits the optical fibers to be closely spaced such that a relatively large number of optical fibers can be spliced without requiring the splicing connector and the associated splice mechanism to be unacceptably large. Furthermore, the retainer of the present invention is advantageously designed to securely engage a fiber optic ribbon by applying a relatively constant force across the width of the fiber optic ribbon, even in instances in which the force that clamps the retainer about the fiber optic ribbon is applied along the edge portions of the retainer. Thus, the splicing connector and associated splice mechanism of the present invention provides a high-quality splice which will not degrade over time.

In the drawings and the specification, there has been set forth a preferred embodiment of the invention and, although specific terms are employed, the terms are used in a generic and descriptive sense only and not for purpose of limitation, the scope of the invention being set forth in the following claims.

That which is claimed is:

1. A connector that is independent of a ferrule and that is mounted upon an end portion of a plurality of optical fibers to facilitate splicing of the optical fibers, the connector comprising:

a housing extending between opposed forward and rear ends;

a retainer disposed at least partially within said housing, said retainer defining a channel through which the plurality of optical fibers extend;

means for securing the plurality of optical fibers within said retainer such that end portions of the optical fibers are exposed through the forward end of said housing in preparation for splicing the optical fibers; and bias means for urging said retainer and the optical fibers secured within said retainer toward the forward end of said housing to thereby permit the optical fibers to be spliced without buckling the optical fibers.

2. A connector according to claim 1 wherein said retainer comprises first and second portions between which the plurality of optical fibers extend, and wherein said securing means comprises a clip that at least partially surrounds said retainer for forcing said first and second portions together in order to secure the plurality of optical fibers therebetween.

3. A connector according to claim 2 wherein an exterior surface of at least one of said first and second portions of said retainer defines an incline such that said first and second portions of said retainer are forced together by moving said clip up the incline.

4. A connector according to claim 3 wherein said housing defines an opening for accessing said clip following assembly of the connector such that the clip can be moved up the incline in order to secure the retainer upon the plurality of optical fibers.

5. A connector according to claim 3 wherein the exterior surface of the portion of the retainer that defines the incline also defines a recess for receiving an end portion of a tool such that said clip is moved upon the incline and said first and second portions of said retainer are forced together by rotating the tool within the recess.

6. A connector according to claim 1 wherein said bias means comprises a spring that operably engages a rear end of said retainer so as to urge said retainer and the optical fibers secured within said retainer toward the forward end of said housing.

7. A connector according to claim 1 further comprising a shroud slidably attached to said housing such that said shroud extends beyond the forward end of said housing to further protect the end portions of the plurality of optical fibers.

8. A connector according to claim 7 further comprising a spring disposed within said housing for operably engaging a rear end of said shroud so as to urge said shroud through the forward end of said housing.

9. A connector according to claim 7 further optic ribbon having a predetermined width, the retainer comprising:

first and second portions having respective inner surfaces that are disposed in a facing relationship, at least one of said first and second portions defining a channel opening through the respective inner surface for receiving the fiber optic ribbon such that the fiber optic ribbon is held within the channel as external forces are applied to said first and second portions to force said first and second portions together, wherein the channel defined by at least one of said first and second portions is further defined by a pair of opposed sidewalls and a contact surface extending between the pair of opposed sidewalls, and wherein a medial section of the contact surface is bowed to compensate for nonuniform applications of external forces across the width of the retainer such that the contact surface uniformly contacts the fiber optic ribbon across the width of the fiber Optic ribbon as said first and second portions are forced together by the nonuniform external forces.

10. A retainer according to claim 9 wherein the medial section of the contact surface extends into the channel to compensate for external forces applied primarily along opposed edges of the retainer.

11. A retainer according to claim 10 wherein the medial section of the contact surface is rounded to extend into the channel.

12. A retainer according to claim 10 wherein the portion that defines a channel having a contact surface that extends into the channel also defines a groove opening through a medial section of an exterior surface of the portion such that forces applied to urge the first and second portions together are primarily applied along opposed edges of the portion that defines the groove opening through the medial section of the exterior surface.

13. A splice mechanism comprising:

a coupling sleeve extending between opposed first and second ends through which first and second pluralities of optical fibers extend, respectively; and a splice body disposed within said coupling sleeve for receiving and aligning end portions of the first and second optical fibers such that respective ones of the first and second optical fibers are optically interconnected, said splice body comprising:

a first portion defining a plurality of grooves for receiving end portions of the first and second optical fibers; and a second portion overlying said first portion to hold the end portions of the first and second optical fibers within the respective grooves, wherein at least one edge of said second portion adjacent one end of the grooves is beveled to facilitate insertion of the optical fibers into the respective grooves.

14. A splice mechanism according to claim 13 wherein the plurality of grooves define an alignment plane in which the first and second optical fibers are optically interconnected, and wherein said coupling sleeve is adapted to receive the first and second optical fibers at a position offset from the alignment plane.

15. A splice mechanism according to claim 13 wherein the beveled edge of said second portion is rounded.

16. A splice mechanism according to claim 13 wherein the edges of said second portion adjacent both ends of the grooves are beveled to facilitate insertion of the optical fibers into the respective grooves.

17. A splice mechanism according to claim 13 further comprising at least one alignment pin extending through said splice body so as to engage a connector inserted within one end of said coupling sleeve.

18. A splice mechanism according to claim 13 wherein said coupling sleeve is adapted to be mounted in a wall such that one end of said coupling sleeve defines a wall outlet.

* * * * *

UNITED STATES PATENT AND TRADEMARK OFFICE

CERTIFICATE OF CORRECTION

PATENT NO. : 5,971,624
DATED : October 26, 1999
INVENTOR(S) : Markus A. Giebel; Dennis M. Knecht; James P. Luther; Thomas Theuerkorn It is certified that error appears in the above-identified patent and that said Letters Patent is hereby corrected as shown below:

| *Claim No.* | *Col.* | *Line* | |
|---|---|---|---|
| 9 | 11 | 28 | Delete "A connector according to claim 7 further" and insert - -A retainer for mounting upon a fiber- - |

Signed and Sealed this

Twenty-third Day of May, 2000

*Attest:*

Q. TODD DICKINSON

*Attesting Officer* *Director of Patents and Trademarks*